H. MORRISON.
PIPE CUTTING MACHINE.
APPLICATION FILED JUNE 25, 1920.

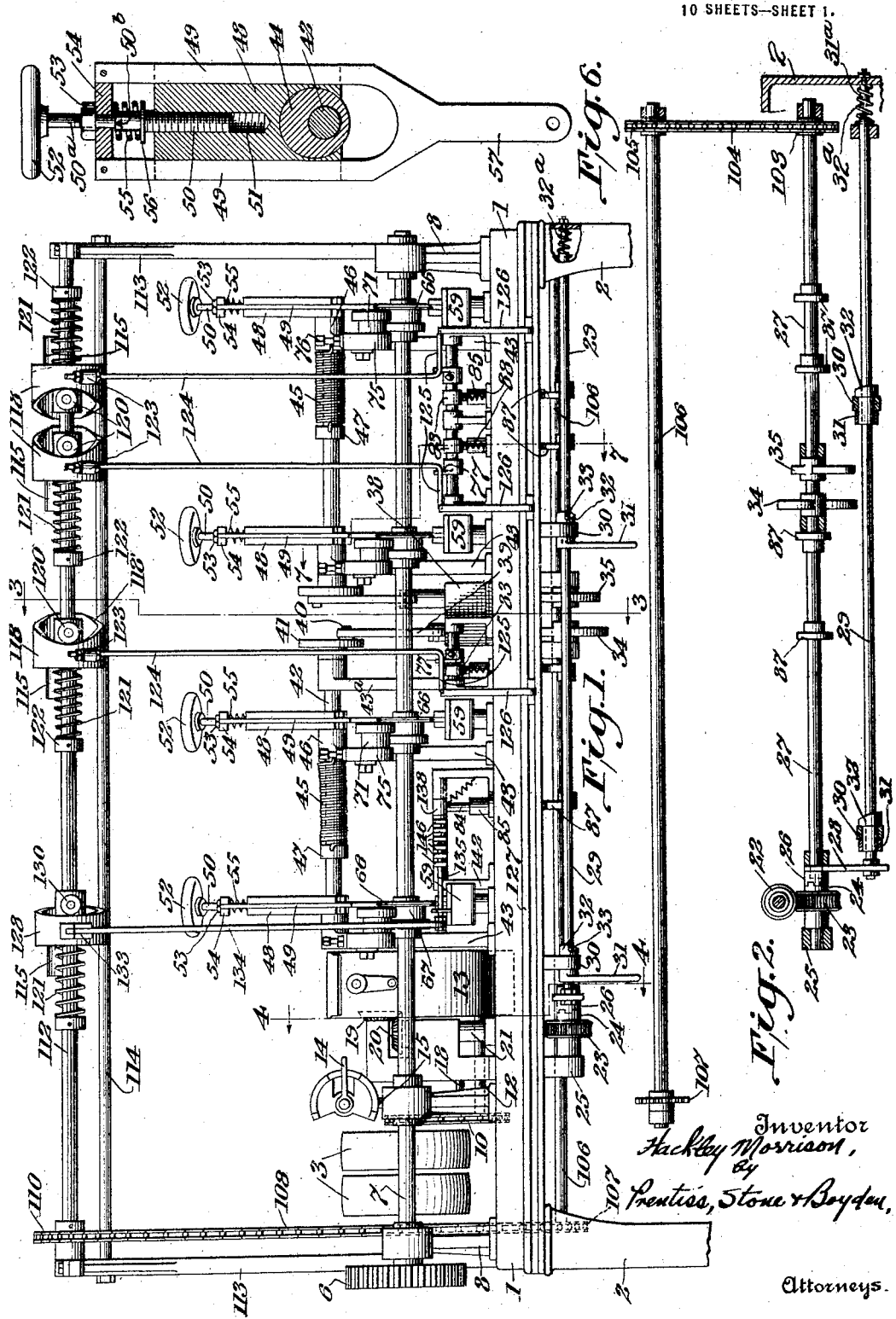

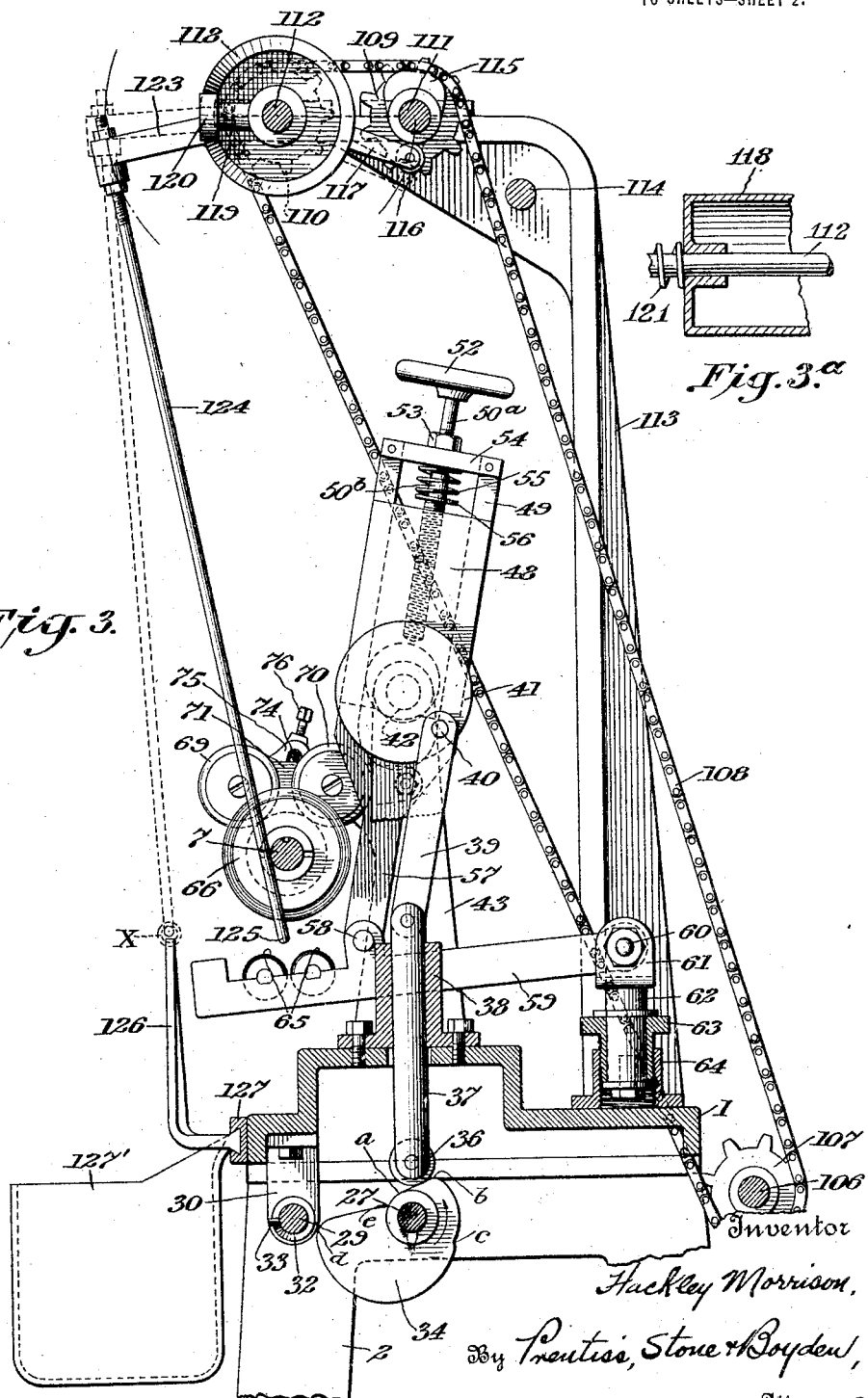

1,411,122.

Patented Mar. 28, 1922.
10 SHEETS—SHEET 3.

Inventor
Hackley Morrison,
By Prentiss, Stone & Boyden,
Attorneys.

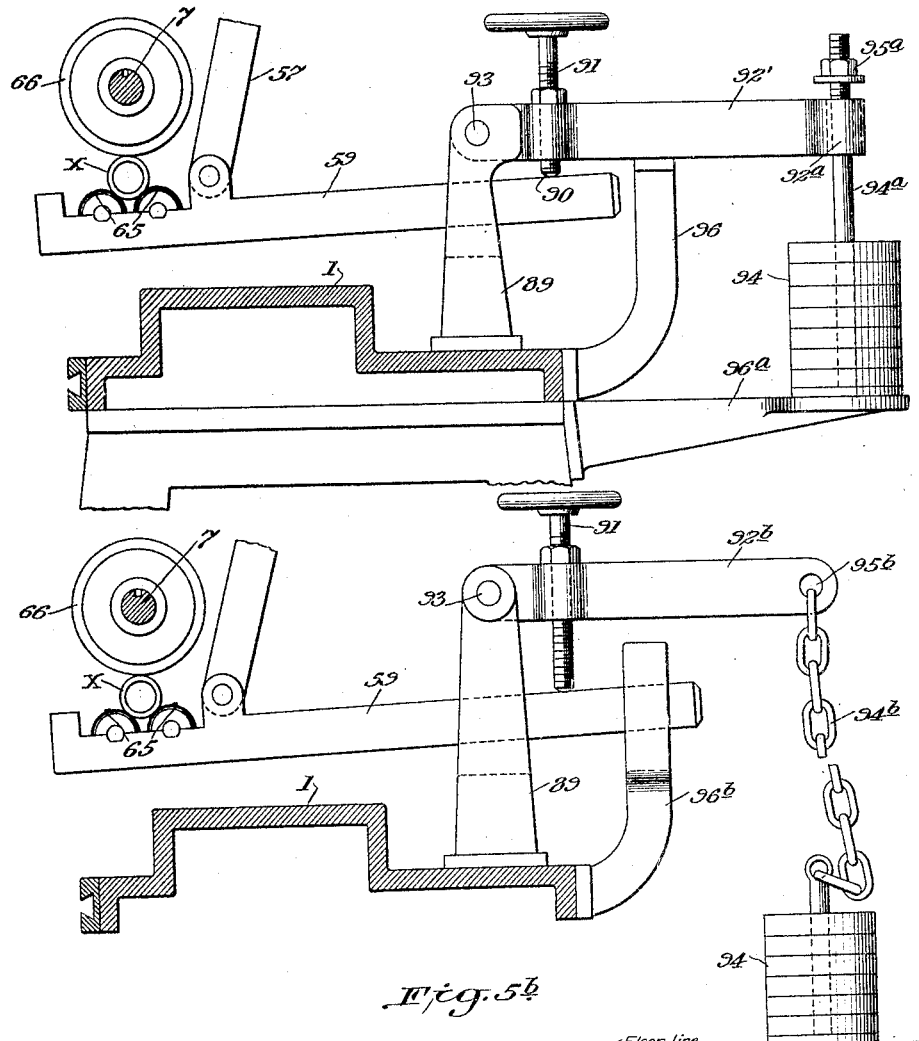

H. MORRISON.
PIPE CUTTING MACHINE.
APPLICATION FILED JUNE 25, 1920.
1,411,122.
Patented Mar. 28, 1922.
10 SHEETS—SHEET 5.
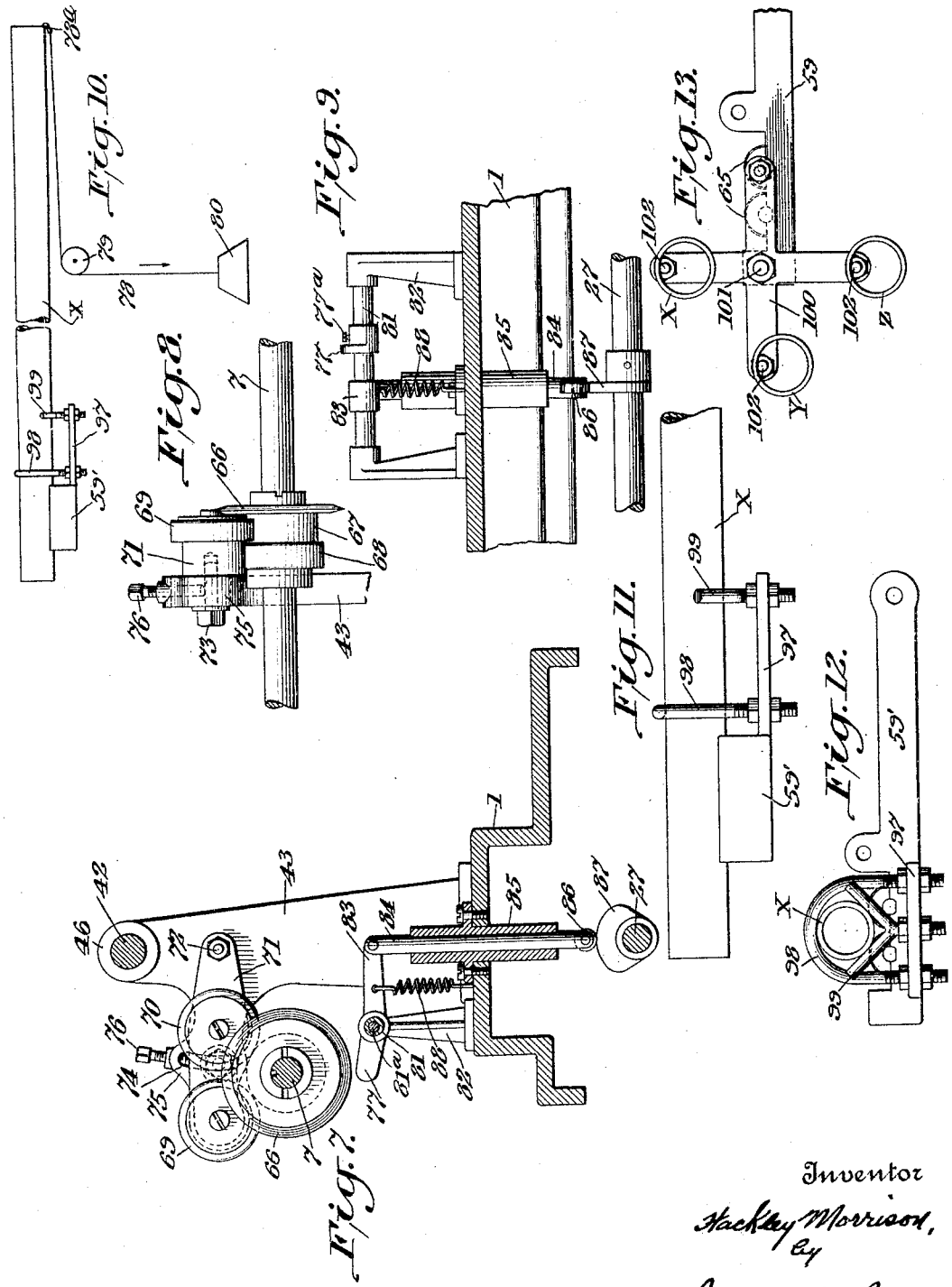

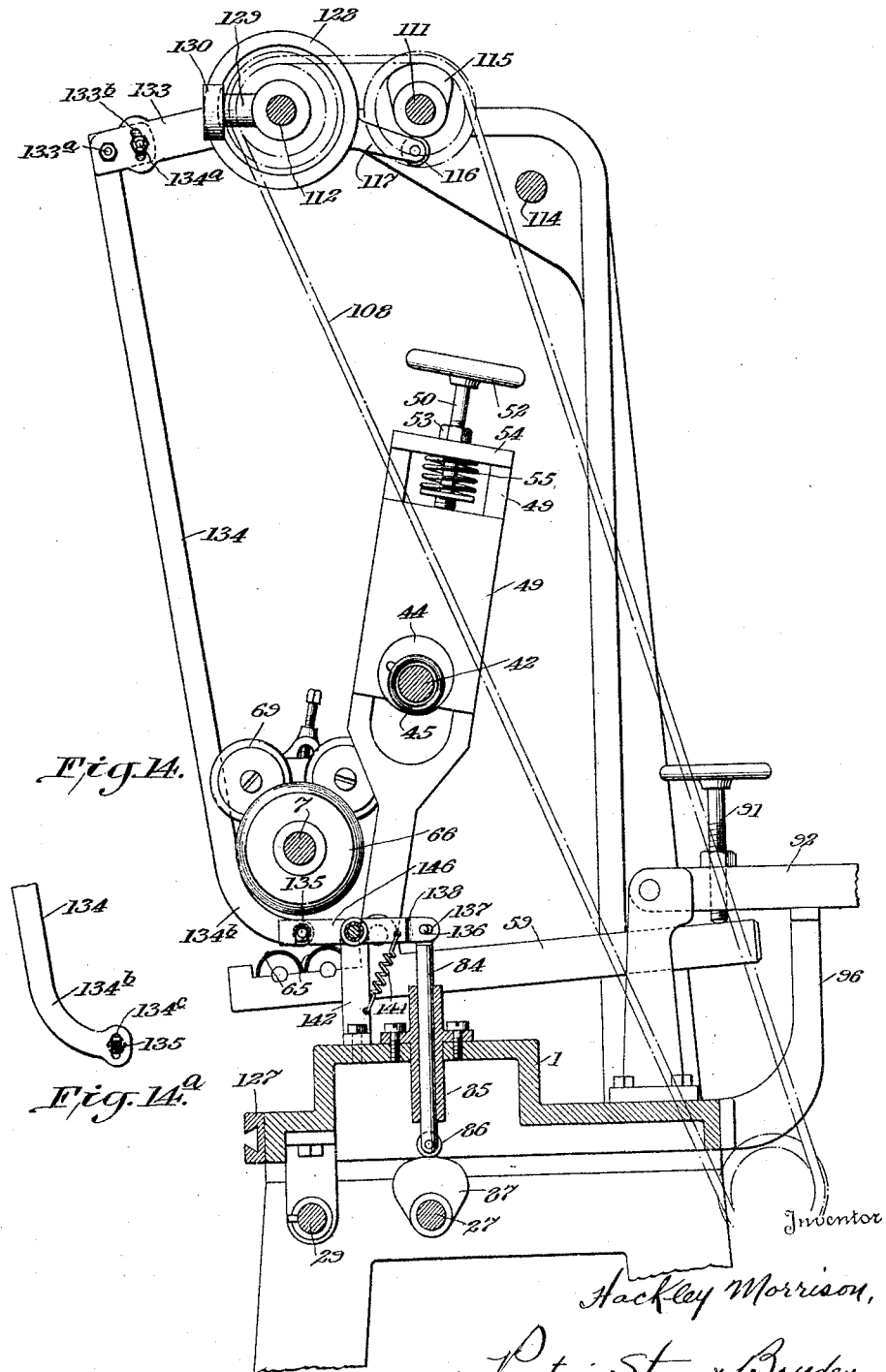

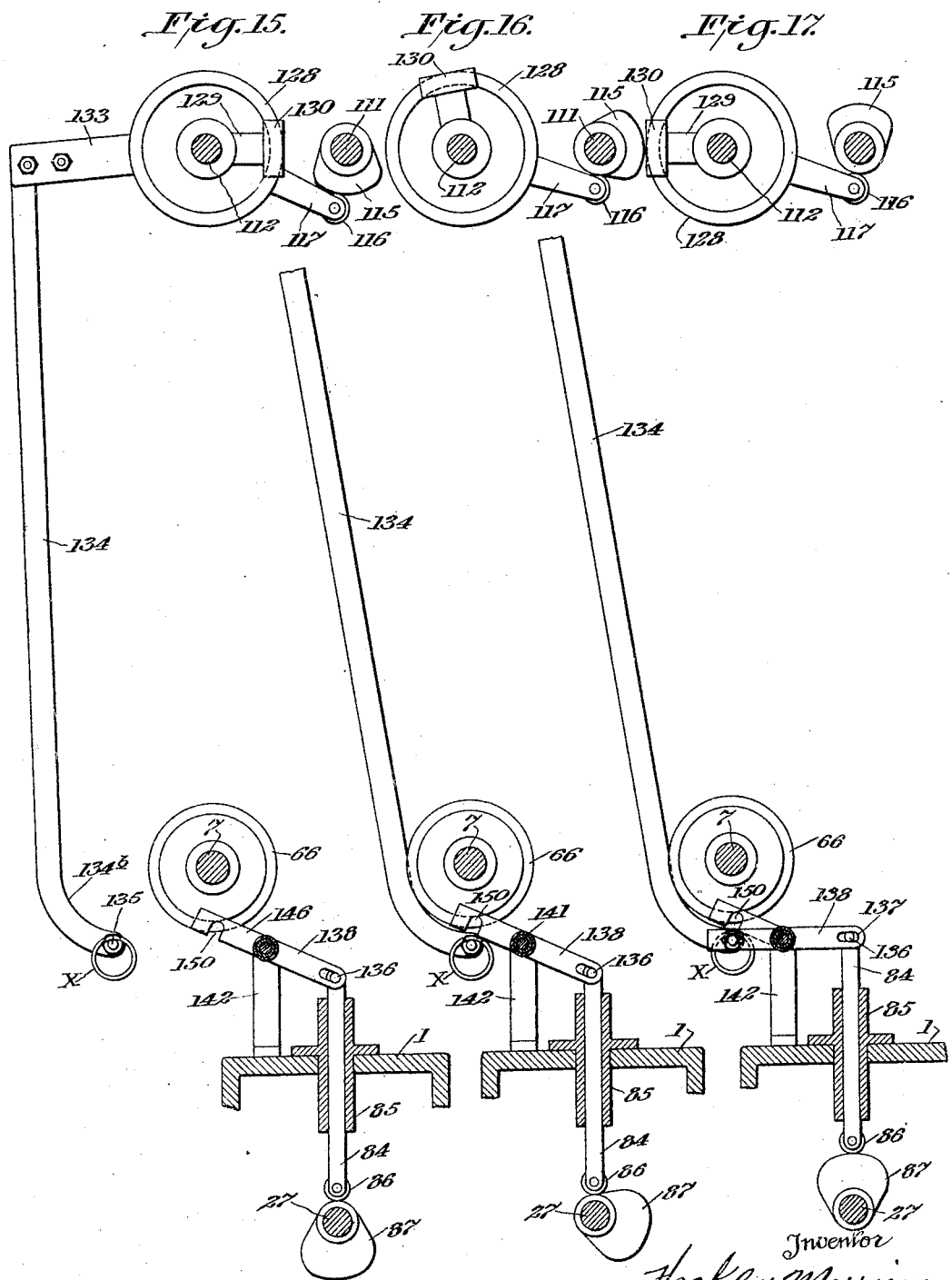

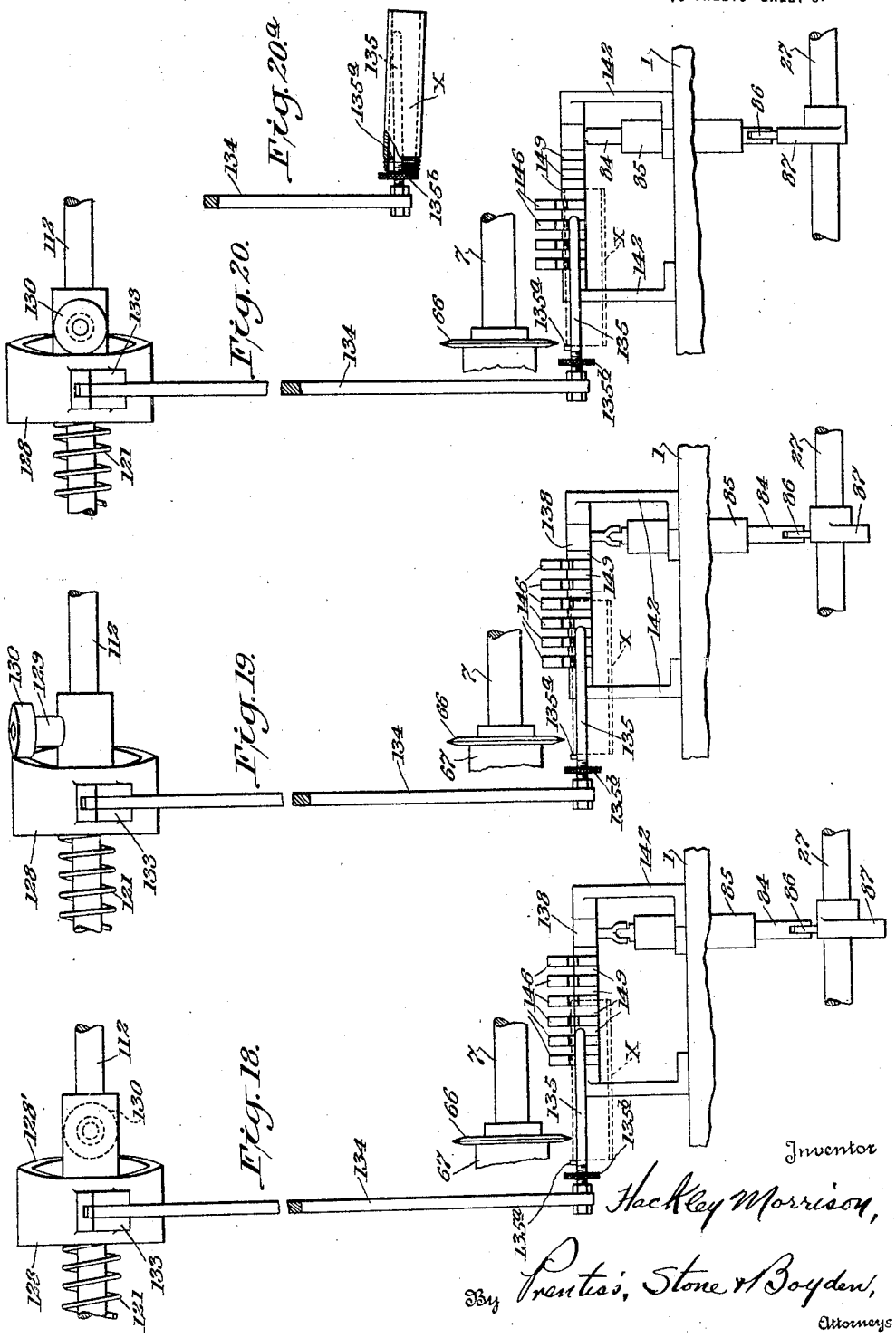

H. MORRISON.
PIPE CUTTING MACHINE.
APPLICATION FILED JUNE 25, 1920.
1,411,122.
Patented Mar. 28, 1922.
10 SHEETS—SHEET 9.
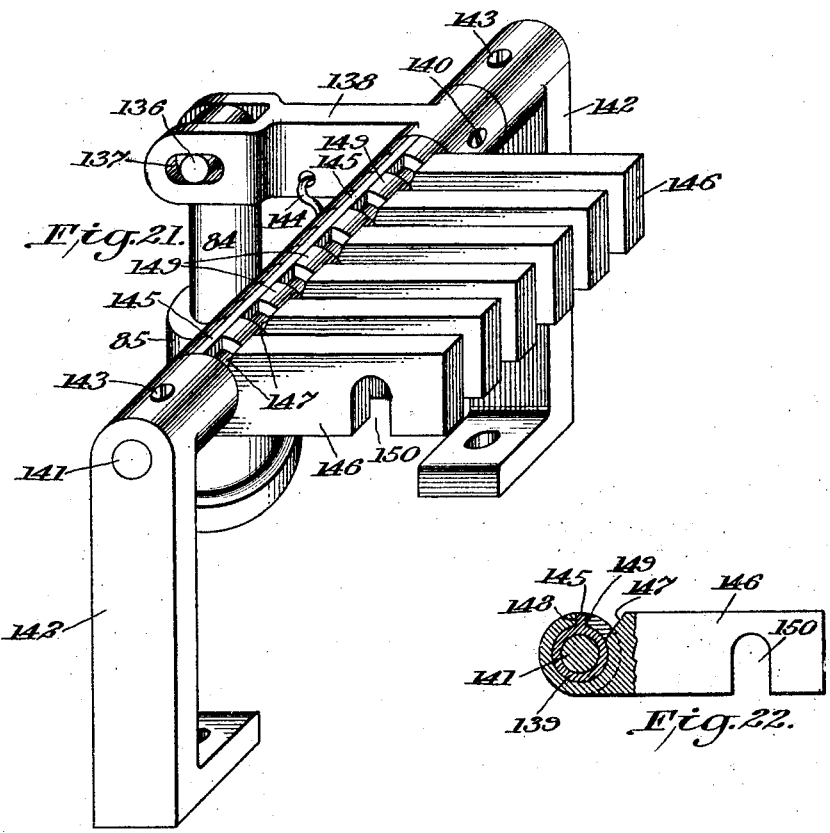
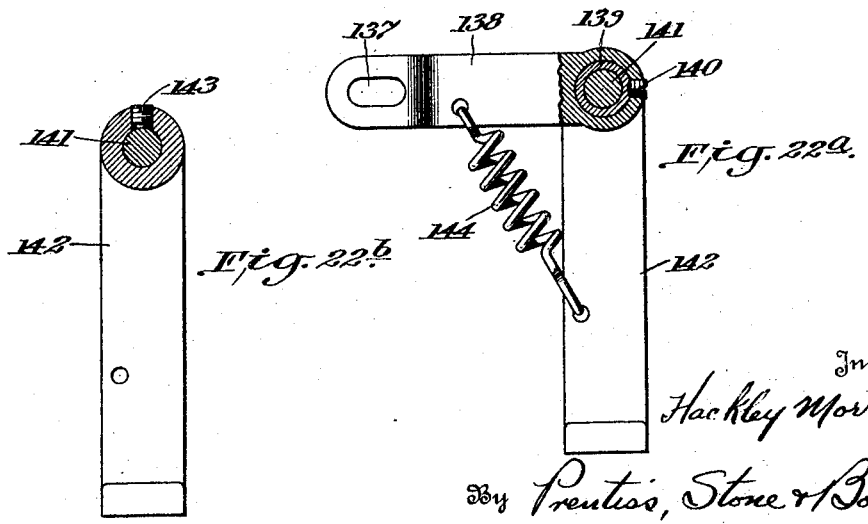
Inventor
Hackley Morrison,
By Prentiss, Stone & Boyden,
Attorneys H. MORRISON.
PIPE CUTTING MACHINE.
APPLICATION FILED JUNE 25, 1920.
1,411,122.
Patented Mar. 28, 1922.
10 SHEETS—SHEET 10.
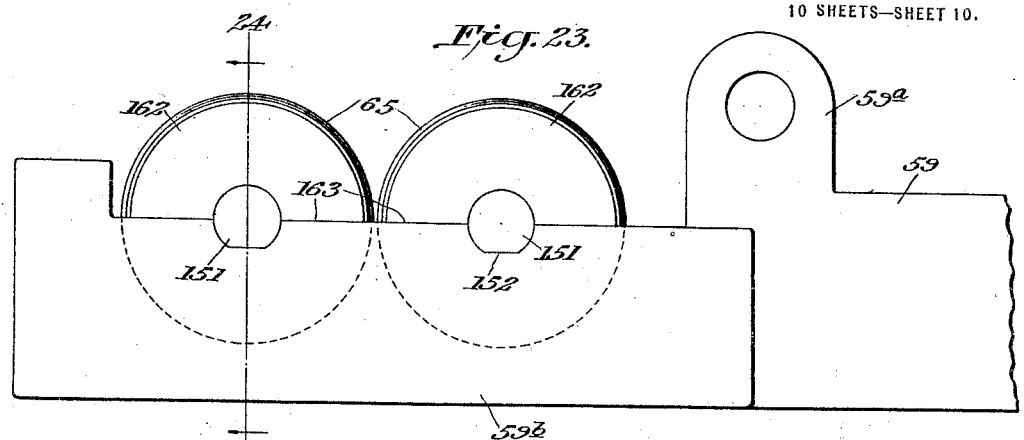
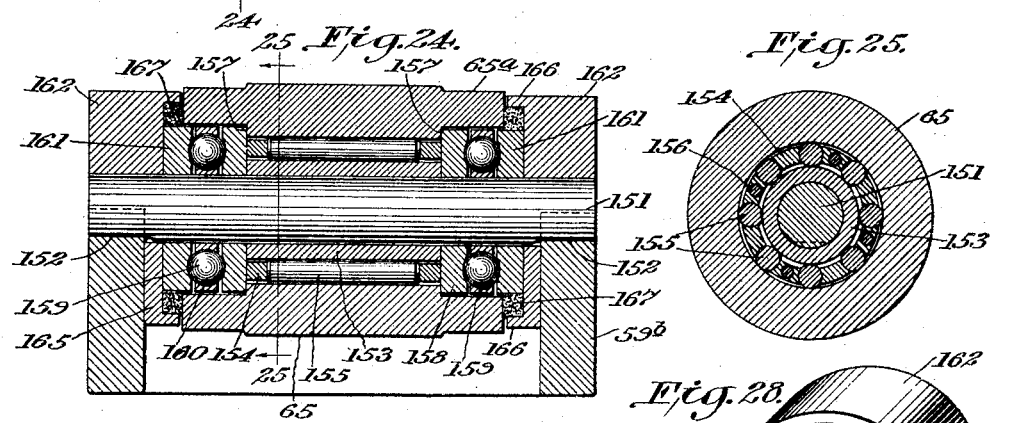
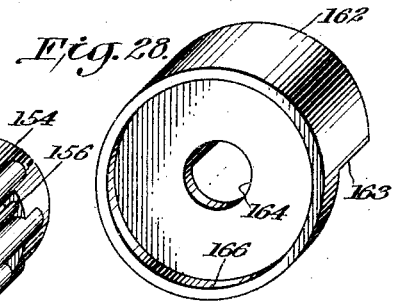
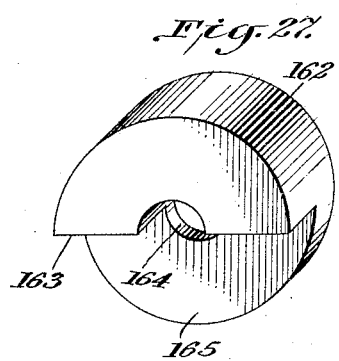
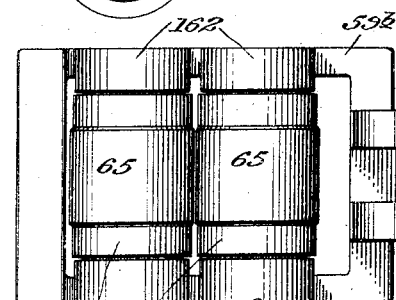
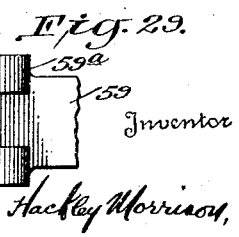
Inventor
Hackey Morrison,
By Prentiss, Stone & Boyden,
Attorneys

UNITED STATES PATENT OFFICE.

HACKLEY MORRISON, OF RICHMOND, VIRGINIA.

PIPE-CUTTING MACHINE.

1,411,122.  Specification of Letters Patent.  Patented Mar. 28, 1922.

Application filed June 25, 1920. Serial No. 391,717.

*To all whom it may concern:*

Be it known that I, HACKLEY MORRISON, a citizen of the United States, residing at Richmond, in the county of Henrico and State of Virginia, have invented certain new and useful Improvements in Pipe-Cutting Machines, of which the following is a specification.

This invention relates to pipe cutting machines, and more particularly to machines for cutting pipe up into comparatively small sections such as are employed in the manufacture of "nipples."

While in its broader aspects the invention contemplates operating on pipe of any length, it is more especially intended to utilize waste or "scrap" pipe consisting of pieces of relatively short length.

Although designed specifically for cutting up wrought iron pipe, many features of my invention are equally applicable to cutting pipes or tubes of other kinds.

Among the objects of the invention are to provide improved mechanism for bringing the pipe and cutter together to effect the cutting operation; to provide practical safety devices to prevent damage to the machine in case of abnormal strain on the cutting mechanism; to construct improved means for sustaining the transverse or radial thrust against the cutter shaft; to arrange means whereby the machine may be instantly stopped in case of emergency; to devise an effective stop or gage device for determining the length of the pipe sections, so designed as to prevent jamming; to provide a novel take-off mechanism for removing the pipe sections from the cutting mechanism as they are cut off; to devise a novel selective stop arrangement for automatically positioning a piece of pipe scrap relative to the cutter so as to minimize waste and obtain the longest standard nipple blank which the scrap is capable of producing; and to provide an improved roller construction for effectively supporting the pipe being cut and forcing it against the cutter.

With the above and other objects in view, the invention consists in the construction, arrangement and combination of parts hereinafter described and claimed, and illustrated in the accompanying drawings, in which—

Fig. 1 is a side elevation of a complete machine embodying my invention;

Fig. 2 is a skeleton plan view of the several shafts employed;

Fig. 3 is a vertical section on an enlarged scale on the line 3—3 of Figure 1;

Figure 3ª is a longitudinal section showing one of the cup shaped cam members hereinafter referred to.

Figure 4:
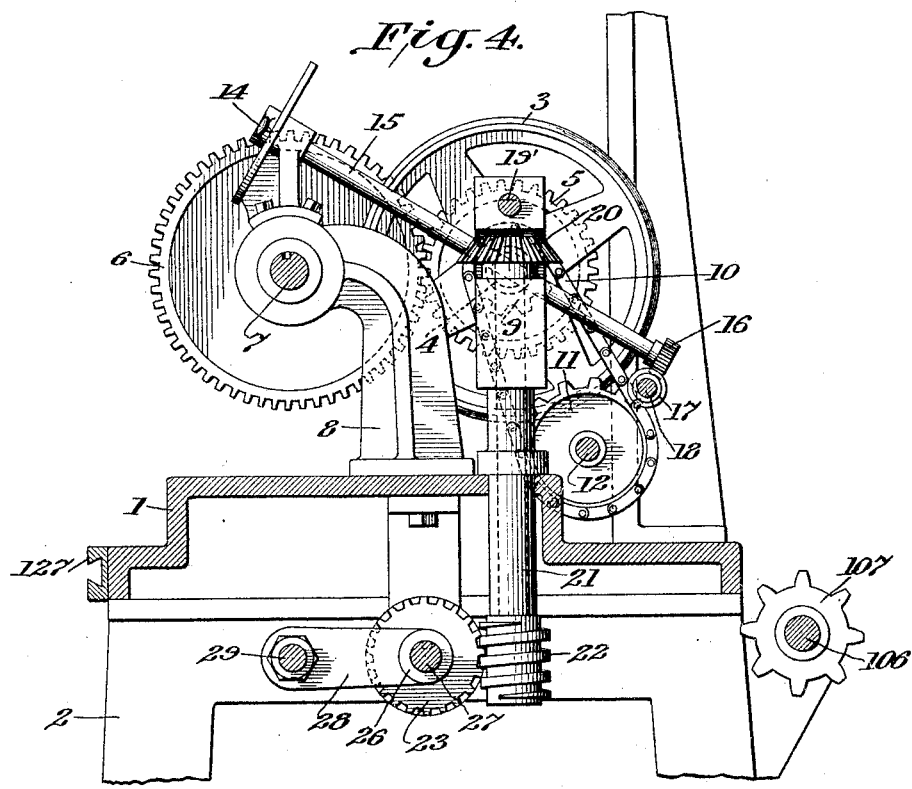
Figure 5:
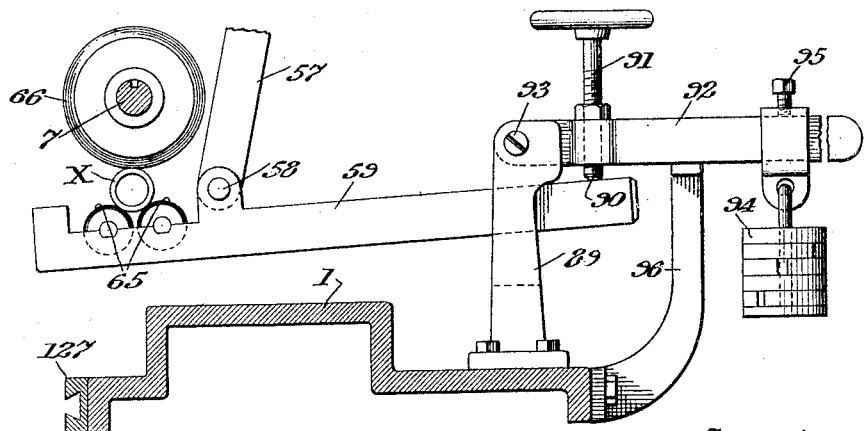

Fig. 4 is a vertical section on an enlarged scale on the line 4—4 of Figure 1;

Fig. 5 is a fragmentary view of the lower portion of Figure 3 showing a slightly modified construction;

Fig. 5ª is a view similar to Fig. 5, but showing a construction somewhat modified to meet the special requirements of galvanized pipe;

Fig. 5ᵇ is a similar view, showing a still further modified arrangement for the same purpose;

Fig. 6 is a sectional elevation of one of the adjustable cross heads which I employ;

Fig. 7 is a transverse section on the line 7—7 of Fig. 1 showing my improved gage or stop device and its relation to the cutter disc;

Fig. 8 is a fragmentary front elevation on an enlarged scale showing one of the cutter discs and the improved thrust bearing associated therewith;

Fig. 9 is a front elevation showing one of the improved gage or stop devices, parts being in section;

Fig. 10 is a diagrammatic view illustrating automatic means for feeding a piece of pipe towards the cutter;

Figs. 11 and 12 are front and side elevations respectively of the form of pipe support shown in Fig. 10;

Fig. 13 is a side elevation of a work feeding device which may be used to advantage in connection with my machine;

Fig. 14 is a view somewhat similar to Fig. 3, but showing the selective stop mechanism, and a slightly modified form of nipple-blank-supporting arm;

Fig. 14ª is a fragmentary detail of the lower end of such arm;

Figs. 15, 16 and 17 are diagrammatic views, similar to Fig. 14, but with parts omitted, showing different successive positions of the selective stop and actuating cams;

Figs. 18, 19 and 20 are fragmentary front elevations of the parts as shown in Figs. 15, 16 and 17, respectively;

Fig. 20ᵃ is a fragmentary front elevation of the arm showing how a scrap having a threaded end is positioned thereon;

Fig. 21 is a perspective view on an enlarged scale, of the selective stop device;

Fig. 22 is a transverse section, showing the method of mounting the selective stop arms, one of such arms being shown partly in elevation;

Fig. 22ᵃ is a similar sectional view, showing the actuating lever in side elevation;

Fig. 22ᵇ is a vertical section through one of the supporting brackets shown in Fig. 21;

Fig. 23 is a side elevation, on an enlarged scale, of the roller bearings on which the pipe to be cut is supported;

Fig. 24 is a vertical section substantially on the line 24—24 of Fig. 23, looking in the direction of the arrows;

Fig. 25 is a transverse section through one of the rollers, substantially on the line 25—25 of Fig. 24;

Fig. 26 is a perspective view of the antifriction bearing structure employed in the said rollers;

Figs. 27 and 28 are perspective views, looking in opposite directions, and showing one of the washers used in assembling the improved roller bearing; and Fig. 29 is a plan view, on a reduced scale, of the supporting rollers shown in Fig. 23.

Referring to the drawings in detail, my improved machine comprises a suitable bed plate 1 supported on legs 2. Power is supplied by means of a pair of fast and loose pulleys 3 mounted on a stub shaft 4 (see Figure 4). This stub shaft carries a gear wheel 5 meshing with a gear 6 which is rigidly secured to the end of the cutter shaft 7 hereinafter more particularly referred to. This shaft is journaled adjacent its ends in suitable pedestals 8 resting on the bed of the machine.

The stub shaft 4 also carries a sprocket wheel 9, shown in dotted lines in Figure 4, and around this sprocket works a chain 10. The chain 10 also engages a sprocket wheel 11 mounted on a shaft 12 which extends into a change speed box 13 of the usual or any desired construction. The speed changes may be effected by means of a lever 14 movable over a dial plate and secured to one end of a shaft 15 (see Figure 4), the other end of which carries a pinion 16 in engagement with a rack 17 secured to a reciprocating rod 18, which extends into the speed box. The selected speed is delivered from the box through a bevel gear 19. The transmission arrangement embodying the elements 9—19 above described constitutes no part of my invention except that I contemplate some arrangement whereby the speed of the bevel gear 19 may be varied independently of the gear 6.

The bevel gear 19 meshes with a similar gear 20 carried at the upper end of a vertical shaft journaled in a sleeve 21 extending through the bed of the machine, and at the lower end of this shaft is a worm 22 engaging a worm wheel 23. By reference to Figures 1 and 2, it will be seen that this worm wheel is rigid with one part 24 of a clutch device which is loosely mounted on a cam shaft 27 supported in journals 25. The other member 26 of the clutch device is keyed to the shaft 27 so as to turn therewith, but be capable of sliding thereon. Secured to the clutch member 26 is an arm 28, to the outer end of which is fastened a non-rotary reciprocatory rod 29 which extends along the length of the machine. A spring 32ᵃ is interposed between the end of the rod 29 and the leg 2 of the machine, such spring being retained in position by a stud 31ᵃ and tending to hold the clutch members 24 and 26 in engagement. The rod 29 is supported in bearing brackets 30, and journaled in each bracket is a bushing through which the rod passes. To one end of this bushing is secured an operating lever 31, and to the other end, a cam 32. The edge of this cam is adapted to engage a pin 33 set into the rod 29, and it will be evident that when the lever 31 is rotated about the rod 29, the cam 32, acting on the pin 33, will serve to force the rod 29 longitudinally to the right against the tension of spring 32ᵃ, and thus withdraw the clutch member 26 from the clutch member 24, thereby disconnecting the cam shaft from the source of power. This is an emergency stop device, and is for the purpose of enabling the cutting mechanism operated by the cam shaft to be disconnected from the source of power instantly from any one of a plurality of operators' stations.

Secured to the cam shaft 27, preferably near the center thereof, are a pair of cams 34 and 35, the shape of which is clearly shown in Figure 3. Each of these cams operates a similar train of mechanism associated with a similar group of cooperating elements, and therefore a description of one will suffice for both. It will be understood that while I have shown two cams operating two groups of mechanisms, only a single cam and group of mechanisms, or three or more such groups may be embodied in a single machine if desired. I have found in practice, however, that the two groups are as much as a single operator can care for. It will be noted that the cams 34 and 35 are angularly displaced around the shaft 27 so that the mechanisms controlled thereby are brought into operation in succession and not simultaneously. This is for the purpose of enabling the operator to feed material first to one group of mechanism and then to the other.

Referring now to Figures 1 and 3, it will be seen that a roller 36 is disposed to bear upon the cam 34, such roller being carried at the lower end of a plunger 37 working through a guide 38 and pivoted at its upper end to one end of a link 39, the other end of such link being pivotally connected at 40 to a crank disc 41 mounted on a shaft 42, journaled in bearing bosses carried by suitable brackets 43 and 43ª. This shaft 42 operates a pair of cutting devices, one of which will now be described. Secured to the shaft 42 is an eccentric 44, (see Fig. 6) and this eccentric works in a block or cross head 48, slidably mounted in a yoke 49. The yoke 49 is adjustable vertically of the cross head 48 by means of an adjusting screw 50, working in a threaded socket 51 in the cross head, and operated by means of a hand wheel 52 on a shaft 50ª, rigid with the screw 50. The screw 50 carries a flange or collar 56, and between this flange and the cross bar 54 is interposed a short stiff helical spring 55. This spring constitutes a yielding connection between the eccentric 44 and the yoke 49, and its tension remains the same regardless of the position to which the cross head 48 may be adjusted, such tension being maintained by a nut 53.

The screw shaft 50 is provided at its upper end, within the spring 55, with a shoulder 50ᵇ, adapted to engage the cross-bar 54, and limit further relative movement between the yoke and cross head after the spring 55 has been compressed to a definite extent, as hereinafter explained.

It will be understood that the cam 34, by virtue of the link 39 and crank disc 41, oscillates the shaft 42 in one direction, the shaft being urged in the other direction by means of a coil spring 45 surrounding the shaft and secured at one end to a collar 47 fast on the shaft, and at the other end to a bearing boss 46 carried by the bracket 43. Owing to the tension of this spring the roller 36 is caused to follow the cam 34.

The lower end 57 of the yoke 49 is pivotally secured at 58 to an arm or bar 59, which is pivoted at 60 to a bracket 61. This bracket 61 (see Figure 3) is carried by a shank 62 provided with a pair of collars between which is rotatably mounted a screw threaded ferrule 63, and this ferrule engages a similarly threaded socket member 64 carried by the bed of the machine. By turning the ferrule 63, it will be seen that the bracket 61, and hence the pivotal point 60 of the arm 59 may be raised or lowered as required.

Adjacent its outer end the arm 59 carries a pair of suitable anti-friction rollers 65, hereinafter described in detail, so disposed as to constitute a rotary support for the pipe to be cut.

Cooperating with these rollers is a cutter disc 66 of well known construction which is adapted to cut the pipe when pressed against the same while rotating. It will, of course, be understood that the bite of this cutter disc against the pipe causes the pipe to rotate, such rotation being possible by reason of the fact that the pipe rests upon the anti-friction rollers 65.

By reference to Figure 8, it will be seen that each cutter disc 66 lies adjacent to a hub or enlargement 67, preferably provided with an annular shoulder 68, this shoulder forming between itself and the cutter an annular trough or groove. In order to support the radial thrust against the cutter shaft 7, I provide a pair of anti-friction rollers 69 and 70, slightly spaced apart and so disposed as to run in the above mentioned trough or groove and bear upon the hub or enlargement 67. The rollers 69 and 70 are journaled in a swinging bracket 71 pivoted at 72 to the support 43. This bracket carries a tap bolt 73 which works in an arc-shaped slot 74 formed in a fixed bracket 75 carried by the support 43, and this bolt may be adjusted in the slot 74 by means of a set screw 76. In this way, as will be readily understood, the position of the rollers 69 and 70 relative to the shaft 7 can be nicely adjusted and as a result, the shaft 7 can be maintained in perfect alignment notwithstanding the radial pressure due to the cutting operation. It will be observed that these rollers constitute means located at the cutter, where the pressure is applied, for sustaining the radial thrust against the shaft.

Owing to the shape of the cutter disc 66, it is obvious that when a section of pipe is being cut off, it tends to expand or move axially parallel with the cutter shaft. If, therefore, a fixed stop is provided against which the end of the pipe abuts so as to determine the length of the section being cut, such section will become jammed between the cutter disc and the stop. This jamming is so pronounced as to impose excessive strains on the stop or cutter disc, or both, and for this reason such an arrangement is objectionable. In order to obviate the above defects, and at the same time secure the benefit of a stop or gage adapted to engage the end of the pipe to determine the length of the section being cut, I have devised a shiftable or retreating stop, shown in detail in Figures 7 and 9.

My improved stop comprises a pipe-engaging arm 77 rigidly mounted on a sleeve 81, and held in adjusted position thereon by means of a set screw 77ª. This sleeve is journaled on a fixed shaft 81ª, mounted in standards 82. Also secured to the sleeve 81 is a rearwardly extending arm 83 pivotally connected to the upper end of a plunger 84 slidably mounted in a vertical guide 85 extending through the bed of the machine and carrying at its lower end a roller 86 which bears upon a cam 87 and secured to the cam shaft 27. It will be obvious that as this cam rotates the stop 77 will be oscillated. When in the position shown in Figure 7 the stop is arranged to engage the upper edge of a piece of pipe which may be pushed up against it, while with the cam in its opposite position, the stop 77 will be raised by a spring 88, acting upon the arm 83, so as to lie above the pipe and out of engagement therewith. It will be noted that the stop is thus shifted or swung vertically out of line with the pipe so that the pipe section is free to expand or move axially without encountering the stop. It will be understood that the cams are so timed that the stop is shifted into its elevated position clear of the pipe just after the cutting operation begins, and after the pipe has been positioned by engagement with the stop. I regard this retreating stop as one of the most essential and important features of my invention.

When the cam 34, as above mentioned, causes the arm 59 to rise, and lift the pipe into engagement with the cutter, it will be observed that during the initial stage of such movement the thrust of the cam is cushioned by the spring 55, and a yielding pressure first applied to the pipe. This sets the pipe in rotation, and then, after it has begun to revolve, the continued travel of the cam compresses the spring, and brings the shoulder 50$^b$ up against the cross-bar 54. Power is then transmitted direct, and forces the pipe positively against the cutter disc to complete the cut. It will be understood that I do not limit myself to the employment of the spring 55 in the exact position shown, since it is obvious that a yielding connection of this character may be located at any point between the cam 34 or 35 and arm 59, and produce the same results.

While the spring 55, shown in Figure 6, will usually yield sufficiently to prevent jamming of the pipe and cause it to rotate properly, I have devised and illustrated in Figure 5, an additional safety apparatus for protecting the mechanism from damage due to excessive strain. This may be employed either with or without the spring 55. Referring to this Figure 5, it will be seen that instead of elements 60—64, illustrated in Figure 3. I have substituted a slotted standard 89, to which a weight beam 92 is pivoted at 93. The outer end of the beam 92 carries a counter weight 94 which may be adjusted longitudinally of the beam and secured in adjusted position by means of a set screw 95. A manually adjusted screw 91 is mounted in the beam 92 between the weight and its pivot, and the lower end 90 of this screw bears upon the end of the arm 59 and serves as a fulcrum therefor during normal operation of the machine. It will be understood that the weight 94 is set at such a point as to more than balance the upward thrust of the arm 59 against the screw 91 under normal operating conditions. The portion 57 of the yoke 49 is pivoted at 58 to the arm 59 at a point between the pipe supporting rolls 65 and the fulcrum point 90. Should, therefore, the pipe X jam and fail to rotate during the cutting operation, abnormal pressure is developed at the outer end of the arm 59 by reason of the upward movement of the yoke, and if it were not for the special construction shown in Figure 5, the pipe might be crushed, the cutter disc broken, or other damage result. With my improved safety device, however, the excessive strain caused by such contingency is relieved, and the pipe caused to revolve by the arm 59 turning about the pipe X as a center and lifting the counter-weight 94 through the medium of the fulcrum point 90. Thus it is evident that power is applied to the arm 59 at a point between the pipe supporting rolls and the fulcrum 90, and that while the arm normally pivots about the fulcrum 90, still, when an abnormal pressure is developed, it will pivot about the pipe X. This is due to the fact that the fulcrum 90 constitutes a yielding pivot or support for the inner end of the arm 59. A bracket 96 is preferably disposed underneath the beam 92 to limit its downward movement. Should the pipe fail to revolve, due to flat spots or other defects, the pressure causes the lever 92 to rise, and this movement results in relieving the strain and thus prevents breakage.

While in the above discussion, I have considered the lever 59 as fulcrumed at 90, and as having the power applied at 58, it may also be proper to consider the point 58 as the fulcrum. In this case, the lever may be said to be subject to two opposing forces, one, the pressure of the pipe against the rolls 65, and the other the pressure of the counter-weight at the point 90, such forces acting on opposite sides of the fulcrum 58. Whichever view of the theory of operation be taken, however, it is clear that when the pressure on the pipe overbalances that of the counterweight, the right hand end of lever 59, as seen in Fig. 5, will "kick up," and by thus yielding, will prevent damage which would otherwise occur.

It will be understood that I contemplate using the construction of Figure 5, either with or without the spring cushion 55, of Figures 3 and 6, and I regard this safety device as one of the most important features of my invention.

Peculiar difficulty has been experienced in cutting galvanized pipe, owing to its softness and consequent tendency to stick and jam. To remedy this, I have devised the modified and very efficient arrangements shown in Figures 5$^a$ and 5$^b$. Referring first to Figure 5ᵃ, it will be seen that in this construction the beam 92' is provided with an eye 92ᵃ through which freely slides a rod 94ᵃ, attached to the weight 94, and provided with an upper screw-threaded end on which works an adjustable nut 95ᵃ. This nut is normally positioned above and spaced from the beam 92', and the weight 94 is supported by resting on a stand or bracket 96ᵃ. The result of this is that during the initial stages of the upward movement of the pipe supporting arm 59, and at the moment of engagement of the pipe with the cutter, the arm is counterbalanced by only the weight of the empty beam 92', so that only a very light pressure is exerted upon the pipe, and the cutter prevented from digging in and sticking. This light pressure starts the pipe to revolve with the cutter, and as the arm 59 continues its upward movement the outer end of beam 92' rises until it engages the nut 95ᵃ. The pull of the weight 94 then serves to increase the pressure on the pipe, to an extent sufficient to make the cut, but as the pipe is already in free rotation, there is no danger of jamming. This feature of bringing the pipe and cutter together under an initial light pressure, and then, after the pipe has begun to rotate, increasing the pressure to effect the cut, is a very important part of my invention, and I regard the method described for producing this result, namely, causing a moving member to pick up a weight at a definite point in its travel, as a most practical one.

Another and slightly different way of doing the same thing is shown in Figure 5ᵇ. Here, instead of the eye 92ᵃ and rod 94ᵃ, I employ a slack chain 94ᵇ, attached at one end 95ᵇ to the end of beam 92ᵇ, and at the other end, to the weight 94, which rests on the floor, or other suitable support. As the arm or beam 92ᵇ rises as described in connection with the preceding figure, it takes up the slack in the chain 94ᵇ, and finally lifts the weight 94 from the floor. In this way, the weight is picked up at a definite point in the cutting process, and the pressure of the cutter on the pipe thus increased. In this modification, a bracket 96ᵇ, having an eye or loop through which the lever arm 59 projects, and which serves as an additional guide for such arm may be employed if desired.

Referring again to Figure 3, the shape of the cam 34 is important. Although useful for black pipe, this shape of cam has been designed especially to obviate the difficulties heretofore encountered in cutting galvanized pipe. From the drawing it will be seen that the working surface of the cam extends for somewhat more than 180°. It begins with a sudden rise from $a$ to $b$, which serves to cause the cutter to slightly bite into the pipe. Then from $b$ to $c$ the cam conforms substantially to the arc of a circle, so that the cutter is not driven further into the pipe, but, on the other hand, the pipe is in this interval, given time to commence revolving freely before the cutting pressure is applied. From $c$ to $d$ the cam makes a gradual rise, thus forcing the cutter into and through the pipe, and completing the cut. Finally, from $d$ to $e$, the cam rapidly falls away, thus lowering the roll carrier, and the idle interval, from $e$ to $a$, provides an opportunity for moving the pipe into position for a new cut. It will be understood that this special form of cam may be used either with or without the "pick up" feature illustrated in Figures 5ᵃ and 5ᵇ.

In some cases, where long pieces of pipe are being cut, I may employ the construction of supporting arm shown in Figures 11 and 12. Referring to these figures, it will be seen that the arm 59' is provided with an extension 97 carrying a U-shaped guide 98 and a Y-shaped guide 99 which are disposed respectively over and under the pipe X.

When cutting up long pipe, means are preferably provided for automatically feeding the pipe towards the cutter and for bringing the end up against the stop arm 77 every time a section has been cut off. This may be accomplished as shown in Figure 10 by means of a weight 80, supported by a cable 78 passing over a pulley 79 and secured at its end by a hook or the like to the end of the pipe X being cut, as indicated at 78ᵃ. It will be obvious that this weight urges the pipe continually forward. The weight 80 holds the end of the pipe against the stop 77. As the arm 59' rises, this retreating stop is timed so as to move away just after the cutter engages the pipe. During the cutting operation, therefore, the thrust due to the weight 80 is taken by the cutter. As soon as the pipe is severed, it moves away from the cutter, and just before it clears the cutter, the stop is lowered again, so that, as the pipe is released by the cutter, the weight brings it up against the stop again. Thus the entire operation is completely automatic, the pipe being continuously thrust forward, and being alternately and momentarily arrested and held by the stop and by the cutter.

In order to facilitate feeding pieces of short pipe to the cutting mechanism, I may provide the arrangement shown in Figure 13. This consists of a spider 100 pivoted at 101 to the arm 59, and provided with a plurality of arms, each of which carries a rod 102 projecting parallel with each other and with the axis 101. Short pieces of pipe, indicated at $x$, $y$ and $z$, may be hung over these rods and the spider rotated so as to bring the pieces of pipe successively into position adjacent the rolls 65.

In machines employing disc and roller cutters of the type described, there is a strong tendency for the small sections of pipe to fly or be violently hurled away from the cutting mechanism as they are cut off. This is especially true where the machine operates at high speed. For this reason it is impossible to have the pipe sections roll or fall by gravity from the cutting mechanism into a receptacle. Instead, they will become scattered about the floor, sometimes being thrown to considerable distances. In order to obviate this difficulty, and to confine the sections and deposit them in a receptacle, I have devised a novel take-off mechanism which forms an important part of my invention. This take-off mechanism is illustrated in Figures 1 and 3. Power for driving such mechanism may be obtained in any suitable way, but in the present embodiment I have shown a sprocket wheel 103 (see Figure 2) on the end of the cam shaft 27, and around this sprocket wheel runs a chain 104 to a similar wheel 105 mounted on a counter shaft 106 journaled at the rear of the machine. This shaft carries at its other end a sprocket wheel 107, around which passes a chain 108 (see Figure 3). This chain extends upwardly and forwardly and at the top of the machine passes over two sprocket wheels 109 and 110, fastened on shafts 111 and 112, respectively. These shafts are journaled at their ends in brackets 113 mounted on the bed plate of the machine and braced at their upper ends by means of a tie rod 114.

The shaft 111 carries a plurality of cams 115, one for each cutting mechanism. These cams are of the shape shown in Figure 3 and are extended longitudinally of the shaft, as indicated in Figure 1. Against each cam 115 bears a roller 116 carried at the end of an arm 117 rigidly secured to a cup shaped member 118, loosely journaled on the shaft 112, and having a cam shaped edge 118'.

Three of these cam members 118 are shown in connection with take-off devices for the three right hand cutters, as shown in Fig. 1. A somewhat similar member 128, shown at the left in Fig. 1, is used for a slightly different purpose, as will be hereinafter described.

Rigidly mounted on the shaft 112 are a plurality of arms 119, one for each cam 118, each arm carrying at its end a roller 120 adapted to bear against the cam edge 118'. Springs 121 surround the shaft 112, and, supported at one end against fixed collars 122 serve to force the cam members 118 longitudinally of the shaft and keep them in engagement with the rollers 120.

Secured to each cam member 118 and projecting forwardly therefrom is an arm 123, and to this arm is secured one end of a downwardly extending picker rod 124, the lower end of which is bent at substantially right angles and extends in a direction parallel with the axis of the pipe being cut. By reference to Figure 3, it will be seen that the bent end 125 of the picker rod is so arranged as to extend into the space between the supporting rolls 65 and the cutter disc 66, as shown in full lines. The cam 115, however, acting upon the roller 116 and arm 117, serves to swing the picker rod outwardly into the position shown in dotted lines in Figure 3. Disposed adjacent the bent end or finger of the picker rod when in its outer or dotted line position, is a stripper 126, suitably and rigidly supported from the frame of the machine. The preferred method of supporting these strippers is by means of a bar 127 secured to the bed of the machine, and provided in its outer face with a longitudinally extending dove-tailed groove into which a tenon on the end of the picker fits. Owing to this method of mounting, it will be seen that the strippers can be adjusted longitudinally of the machine and brought into just the correct position to properly cooperate with the picker rods. The dove-tailed slot in the bar 127 may also serve as a convenient means for supporting suitable baskets or receptacles 127', which are so positioned as to receive the pipe sections delivered by the picker rod. It will be seen that the roller 120, acting against the cam edge 118 as the shaft 112 revolves, causes the cam member 118 to reciprocate on the shaft 112. At the same time the rotation of cam 115 causes the member 118 to oscillate on the shaft 112. As a result of this compound reciprocating and oscillating movement the lower end of the picker rod is caused to travel in a substantially rectangular path. It first swings inward until the finger at the lower end thereof is in alignment with the pipe being cut. It then moves to the left, as shown in Figure 1, thus causing this finger to enter the pipe section. As soon as the section is severed the picker swings outward again into the position shown in dotted lines in Figure 3, carrying the section with it, and is then shifted toward the right in Figure 1 (or away from the plane of the paper in Figure 3) so as to cause the end of the stripper 126 to engage the end of the pipe section (indicated in dotted lines at X in Figure 3) and push such section off of the finger. This completes the cycle of operations, and the released section falls into the receptacle 127'.

It will be observed that this picker rod holds the pipe section so as to prevent it from flying away, and at the same time engages it so loosely as to permit it to rotate freely while being cut. Both of these results are essential to the success of a take-off mechanism for a pipe cutting machine of this general type. I believe it to be broadly new with me to provide means for loosely holding the pipe section and for feeding it laterally away from the cutting mechanism and depositing it within a receptacle.

The operation of the machine as thus far described will be apparent without detailed description. The pieces of pipe to be cut are laid by hand upon the supporting rolls 65 of the arms 59, and these arms are moved upward by the cams 34 and 35 so as to bring the pipe into engagement with the cutter discs. The arms 59 of one group move up to effect cutting, while the arms of the other group are moved down or remain idle. In this way a single operator may feed pipe to both sets of cutting mechanisms, moving back and forth from one operator's station to the other, or the pipe on one or more of the arms may be fed automatically as in Fig. 10. By virtue of the adjusting screw 50 (Figure 6) the position of the arms 59 relatively to the cutters may be varied to take care of pipe of different diameters. An excessive strain on the mechanism is prevented by the safety lever device of Fig. 5, or by the yielding of spring 55, or by both these devices acting together. The retreating stops 77 are properly timed by the cam shaft so as to be shifted into and out of operative position as required, and the picker rods are also automatically timed by the cams so as to properly perform their function.

In cutting up a piece of pipe into nipple blanks of any standard length, there will, of course, always be a scrap end left over which is shorter than the standard blank being cut. Thus if the machine is set to cut five inch blanks, there will be a scrap less than five inches long left over. An important object of my invention is to devise efficient means for utilizing these scraps to the best advantage. Obviously the time and labor necessary to take each scrap and measure it, and then set the gage or stop arm so as to cut a shorter standard nipple blank, would be prohibitive. I have, therefore, succeeded in devising means for automatically cutting from such scrap the longest standard nipple blank, which the scrap is capable of producing, thus reducing wastage to a minimum. In other words if, in the above limitation, we have a scrap less than five inches long, say for instance, three and three-eighths inches long, my improved machine will automatically cut from this scrap the longest standard nipple blank possible, that is to say, a three inch blank, thus wasting only a fragment three-eighths of an inch long.

This automatic selection and gaging of the longest possible standard blank is accomplished by means of what I shall designate as my improved selective stop mechanism. The general arrangement of one such mechanism is shown at the left in Fig. 1 and the details are fully illustrated in Figs. 14 to 22$^b$, inclusive.

Referring to these figures, it will be seen that on the shaft 112 is mounted a cup shaped member 128, similar to the members 118, capable of sliding on the shaft and provided with a cam edge 128′. The member 128 is urged toward the right of Figure 1 by means of a spring 121 in the same manner as that described in connection with the members 118. A cam 115 is also associated in a similar manner with the member 128 and bears upon a roller 116 carried by a lever arm 117 rigidly secured to the member 128 (see Figs. 14 to 17, inclusive).

Rigidly mounted on the shaft 112 adjacent the member 128 is an arm 129 carrying at its end a roller 130 adapted to engage the cam edge 128′ of such member.

Rigidly secured to the member 128 and projecting forwardly therefrom is an arm 133 to which is secured a depending picker arm 134. This arm is preferably provided at its upper end with a short bell crank portion which is pivotally secured to the arm 133 by means of a bolt 133$^a$ and also carries a bolt 134$^a$ which works through an arc shaped slot 133$^b$ formed in the arm 133 (see Fig. 14). By loosening the bolt 134$^a$, it is apparent that the angular position of the arm 134 relative to the arm 133 may be adjusted.

The lower end of the arm 134 is bent inwardly as indicated at 134$^b$, so as to bring its extreme end substantially under the axis of the cutter disc 66. In such extreme end of the arm 134 is set a finger 135, such finger extending parallel with the axis of the cutter. This finger 135 is preferably secured by means of nuts in a vertical slot 134$^c$ formed in the arm 134 as illustrated in Fig. 14$^a$, so that the position of the finger relative to the cutter may be adjusted vertically as required.

It will be understood that this improved construction of picker arm and finger is supposed to be embodied in Figs. 15 to 17, although the details are not there shown. It will also be understood that the picker arms 124 shown in Figs. 1 and 3 may and preferably should be constructed in this manner, the illustration of these arms in Figs. 1 and 3 being more or less conventional.

The selective stop device, itself, is shown best in Fig. 21. It is operated, like the stops 77, by means of a cam 87 on the shaft 27, through the instrumentality of a plunger 84 carrying at its lower end a roller 86 adapted to bear upon the cam 87 and working freely through a vertical guide 85. Referring to Fig. 21, it will be seen that the upper end of the plunger 84 carries a cross pin 136 working through a pair of slots 137 formed in the end of a lever or crank 138. This lever or crank is rigidly secured to a hollow sleeve 139 (see Fig. 22) by means of a set screw 140. This sleeve is supported by and journaled upon a rod or shaft 141 which is stationary and is supported at its ends by a pair of brackets 142, in which it is rigidly held by means of set screws 143. A spring 144 extending between the arm 138 and one of the brackets 142 tends to pull said arm and plunger 84 downwardly in a direction opposite to that in which they are moved by the cam 87. This spring has been omitted from Figs. 15 to 20, for the sake of simplicity, but, of course, is supposed to be present.

Extending along the upper side of the sleeve 139 is a longitudinal rib or flange 145 (see Figs. 21 and 22) and journaled freely on the sleeve on a series of stop arms 146 which normally project horizontally as shown in Fig. 21. That part of each of these stop arms which surrounds the sleeve 139 has a portion or segment thereof adjacent the rib 145 cut away, so as to present a pair of opposed radial shoulders 147 and 148 (see Fig. 22). The stop arms 146 are uniformly spaced from each other along the sleeve 139 either by hub extensions, or by separate interposed spacing washers 149, which washers are cut away so as to permit them to receive the rib 145 when they are fitted over the sleeve.

Nipples as now standardized are made in multiples of one-half inch in length; thus standard nipples run 2, 2½, 3, 3½, etc., inches long. I, therefore, space my selective stop arms 146 a distance of one-half inch from center to center, or, which is the same thing, from one working face to a similar working face. Any desired number of such arms may be employed, but in the drawings, I have shown six, and this number will take care of nipple blanks from 2½ to 5½ inches, six inches being the longest standard nipple usually manufactured.

Each stop arm 146 is provided with a notch 150 in its lower edge, such notch being disposed in longitudinal alinement parallel with the shaft 141, and with the cutter shaft 7, to receive the supporting finger 135, as will now be described.

With the above general description of its construction my improved selective stop mechanism will best be understood from a description of its operation.

As will be obvious, the elements 128, 129 and 130, in connection with the cam 115 operate in a manner similar to that of the elements 118, 119 and 120, heretofore described. That is to say, as the shafts 111 and 112 revolve the picker arm 134 will be caused to swing laterally and to travel longitudinally, performing a complete cycle of movements. In the present case, however, the position of the arms and finger relative to the stop and cutter is reversed, so that the arm and finger serve to convey the scrap of pipe into cutting position as well as to remove it therefrom. While with the arms 124 the pipe was fed to the cutter by hand or otherwise, and was automatically removed by the picker arms, and automatically stripped from the fingers 125, in the present case the arm 134 serves to automatically feed the pipe scrap into position to be cut, and, after being cut, the nipple blank is removed from the finger 135 by hand.

A scrap end X (which is ordinarily less than six inches long) is slipped onto the finger 135 by the operator, when such finger is in the position shown in Fig. 15. When the finger is in this position, the arm 138 has been moved by the spring 144 to its lowermost position, thus elevating all of the stop arms 146 simultaneously into a position above the path of movement of the finger 135, that is to say, above the axis on which the pipe lies when being cut. This lifting of the arms 146 is due, in the construction shown, to the engagement of the rib 145 with the shoulders 148 of the arms. Other constructions for simultaneously lifting the arms may, however, be employed, without departing from the spirit of the invention.

As the cam shafts revolve, the arm 134 is next caused to swing inward into the position shown in Fig. 16, carrying the pipe scrap into a position immediately below the cutter disc, or between such cutter disc and the supporting rolls. Figs. 18 and 19 are front elevations corresponding to Figs. 15 and 16, respectively. As shown in Fig. 18, the end of the scrap engages a pin 135ᵃ carried by the finger 135. In other words, the operator slips the pipe scrap onto the finger 135 until it stops against the pin 135ᵃ.

After the finger and pipe scrap reach the position shown in Figs. 16 and 19, the cam 87 begins to move the plunger 84 upwardly, and this permits the stop arms 146 to fall by gravity towards such finger and pipe scrap. As these stop arms descend, some of them will engage and rest upon the top of the pipe scrap, while others, which are positioned beyond the end of the scrap, as shown in Fig. 19, will come all the way down into horizontal position. After the stop arms have reached this position, the cam 87 is constructed so as to produce a "dwell", thus permitting them to remain so for a short interval, and during this interval, the roll 130 moves to such a position relative to the cam edge 128′ as to permit the spring 121 to force the member 128, and with it the arm 134 and finger 135, to the right as viewed in Figs. 18 to 20, thus pushing the right hand end of the pipe scrap snugly up against the nearest horizontal stop arm. Thus in Fig. 19 the pipe scrap X is shown of such length as to support four of the stop arms, while two of them are permitted to assume the horizontal position. The end of the scrap is then yieldingly brought up against the left hand face of the second stop arm by means of the spring 121 as shown in Fig. 20 and as soon as this position is reached, the cam 34 (see Fig. 3) raises the arm 59 and makes the cut, the finger 135 remaining in the pipe and lying between the cutter disc and rolls during the cutting operation. It will, of course, be understood, that as soon as the cutter disc engages the pipe scrap, all of the stop arms 146 are again elevated, so as to move them away from the pipe scrap, to prevent binding and jamming, as described in connection with the stop 77, such elevation of the arms being properly timed by the shape of the cam 87. After the cutting is completed, the arm 134 is caused to swing outward again toward the position shown in Fig. 15, and at the same time is shifted slightly to the left by the roller 130.

It will be understood that where the unit of length employed is a half-inch as above assumed, the entire longitudinal movement of the member 128 on the shaft 112 does not exceed this unit, and consequently the fragment of pipe trimmed from the scrap to produce a standard blank is always less than half an inch. As shown in Fig. 20, an extremely small fragment will be trimmed off, probably not more than one-eighth of an inch, since the scrap is illustrated as being almost an exact number of units in length. Had the scrap been a fraction of an inch longer, the fragment trimmed off would have been correspondingly wider or longer. Had the scrap been (say) from a half to three-quarters of an inch longer, then five of the stop arms would have been held up and the end of the scrap would have been brought up against the last stop arm. Had the scrap been an inch or two shorter, then only the first or the first and second stop arms at the left would have been supported, and the scrap would have been positioned by its end engaging (say) the third stop arm, etc.

From the above it will be seen that a scrap of any length, between the limits for which the machine is designed, will be automatically positioned by this selective stop mechanism, so that only a small fragment less than the unit of length employed, will be trimmed off, and the longest possible nipple blank or section will be produced from the scrap. By this automatic mechanism, the operator is entirely relieved of the necessity of manually setting a stop, or of manually positioning the scrap. All he has to do is to slip the scrap onto the finger until it engages the pin 135$^a$. The finger then automatically swings in toward the cutter, the stop arms come down, the arm 134 shifts the scrap until its end abuts against the nearest horizontal stop arm, and then the cutting operation automatically takes place.

In many cases, when cutting up pieces of used or second-hand pipe, a scrap end will be encountered which has on it a more or less mutilated thread. Obviously such a scrap must be positioned, so that the cut will be made far enough from the end to completely remove such old threaded portion. For this purpose I provide a second stop on the finger 135, this stop being shown as comprising a knurled nut or washer 135$^b$ (see Fig. 20$^a$) spaced back from the pin 135, a distance approximately equal to the length of such threaded portions, that is to say, usually about three-quarters of an inch. Therefore, when the operator encounters a scrap having a threaded end, he will place it on the finger 135 with such threaded end abutting the stop nut or shoulder 135$^b$ as shown in Fig. 20$^a$, the pin 135$^a$ in this case lying inside of the pipe scrap and being idle. The selective stop mechanism will then operate as above described, and the fragment trimmed off will include the threaded end, as well as the fraction of the unit of length, which would otherwise be removed. Thus when using a scrap with two plain ends, it is brought up against the pin 135$^a$; when cutting a scrap with a threaded end, such end is caused to abut the nut 135$^b$.

While I regard the automatic positioning of the pipe scrap relative to the selective stops as an important and highly desirable feature of my invention, I also contemplate, under some conditions, using the selective stops by manually placing the scrap in position. When working in this way, the operator places the scrap in substantially the desired position while the stop arms are elevated, and then, after they have been lowered, pushes the end of the scrap up against the adjacent arm. A section of some standard length is thus automatically determined, without measuring.

The supporting rolls 65, on which the pipe to be cut bears, form an important part of my invention. Great difficulty has heretofore been experienced in designing a roll which would withstand the heavy pressure and high speed encountered in pipe cutting machines of this type. Furthermore it has been difficult to keep such rolls properly lubricated and to exclude grit and chips from their bearings.

I have succeeded in providing a construction of roll which stands up perfectly under the most severe strain, which will wear indefinitely, and in which very efficient lubrication is obtained. My improved construction is illustrated in detail in Figs. 23 to 29 of the drawings.

Referring to these figures, it will be seen that the arm 59 which carries the rolls 65 is provided with a rectangular frame or carrier 59$^b$ in which the rolls are mounted, such arm also having a pair of spaced lugs 59$^a$ to which the yoke 59 (see Fig. 3) is indicated.

The two rolls are exactly similar, and a description of one will suffice for both. Each roll is supported by a stationary shaft 151 of relatively soft tough steel. This shaft lies in notches or recesses formed in the upper edges of the frame 59$^b$ and is preferably provided at its ends with flat spots 152 to prevent rotation. Surrounding this shaft with a snug slip fit is a hardened tool steel sleeve 153. The roll, itself, comprises a hollow cylindrical body or barrel which is journaled on the sleeve 153, antifriction roller bearings being interposed between the sleeve 153 and the body of the roll, which body is also made of tool steel. The details of the roller bearings are shown in Figs. 25 and 26. Such bearings consist of a pair of end rings 154 held together in spaced relation by means of tie rods 156, thus constituting a cage in which hardened steel rollers 155 are mounted. Thus the wear all takes place between hardened steel surfaces, while the soft steel shaft 151 provides the necessary strength. If the entire shaft were made of hardened steel, it would be very liable to crack and break.

In order to take up the end thrust of the rolls, I provide at each end of the above mentioned roller bearings a suitable antifriction thrust bearing. Each of these thrust bearings as shown comprises a pair of grooved disks 158 and 161, constituting race ways and between these discs is placed a series of balls 159 held in a cage 160. The inside of the body of the roll is bored out to receive these thrust bearings. The inner discs 158 bear against shoulders 157 formed on the inside of the body or barrel and the entire thrust bearings are practically housed within such body. The outside of the body or barrel is reduced at its ends as indicated at 65$^a$ so as to cause the pipe to bear only on its middle portion, which is directly supported by the roller bearings 155. Owing to the fact that the projecting end portions of the body are unsupported, they would be liable to be broken were they not reduced in external diameter as shown, so as to prevent the pipe from engaging them.

The thrust bearings are held in assembled relation by means of a pair of end plates 162 which are of the form shown in Figs. 27 and 28. Each is preferably provided with a shoulder 163 adapted to seat on the edge of the frame 59$^b$, and with a central opening 164 adapted to receive the shaft 151. The inner portion of each plate is in the form of a disc as indicated at 165 and the inner face of such disk is provided with an annular flange 166 forming between itself and the outer race way 161, an annular groove or seat, in which lies a felt or other fibrous washer or packing 167.

It will be understood that the entire roll and its bearings lie in the frame 59$^b$ and are held there in assembled relation simply by gravity, the thrust bearings being interposed between the body of the roll and the end brackets 162 and being housed within said roll. The roller bearings and thrust bearings are packed with suitable grease and the felt washers 167 prevent the escape of such grease and also seal the bearings against the entrance of grit and foreign matter. Rolls constructed as above described have been found in practice to give excellent results.

It will, therefore, be seen that I have provided a pipe cutting machine especially designed in the production of nipple blanks of short sections, such machine having many highly novel and important features including the various safety devices, stop and take off mechanisms and supporting rolls, and it is thought that its marked advantages will be readily appreciated without further discussion.

What I claim is:

1. In a pipe cutting machine, the combination with cutting elements comprising supporting rolls and a cutter disc, of power operated means for moving one of said elements toward the other, and a yielding cushion included in the connection between said power operated means and movable element.

2. In a pipe cutting machine, the combination with cutting elements comprising supporting rolls and a cutter disc, of power operated means for moving one of said elements toward the other, a yielding cushion interposed between said power operated means and movable element, and means for varying the limits of movement of the latter relative to the other element.

3. In a pipe cutting machine, the combination with cutting elements comprising supporting rolls and a cutter disc, of power operated means for moving one of said elements toward the other, a spring interposed between said power operated means and movable element, and means for varying the limits of movement of the latter relative to the other element, while maintaining the tension of said spring constant.

4. In a pipe cutting machine, the combination with supporting rolls and a cutter disc, of power operated means, including a pivoted arm, for moving one of said elements toward the other, and a yieldably mounted pivotal support for said arm arranged to protect the cutting mechanism against excessive strain.

5. In a pipe cutting machine, the combination with supporting rolls and a cutter disc, of means for moving the one toward the other to effect a cut, and automatic means for limiting to a predetermined amount the maximum possible pressure on the work held between the rolls and cutter disc.

6. In a pipe cutting machine, the combination with supporting rolls, and a cutter disc, of an arm in which one of said elements is journaled, means for applying power to said arm to move the carried element toward the other, and a normally rigid pivotal support for said arm, said support having means permitting it to yield whenever the pressure on the rolls exceeds a predetermined amount.

7. In a pipe cutting machine, the combination with supporting rolls, and a cutter disc, of an arm in which one of said elements is journaled, a yieldingly mounted support on which said arm is pivoted, and power operated means for moving said arm, said means acting upon the arm at such a point that the thrust of the cutter disk against the work is opposed and sustained by the pressure of the arm against said yieldingly mounted support.

8. In a pipe cutting machine, the combination with supporting rolls and a cutter disc, of an arm in one end of which one of said elements is journaled, a yieldingly mounted support on which the other end of said arm is pivoted, and power operated means for moving said arm and acting upon the same at a point between its pivot and the cutting element carried by the arm.

9. In a pipe cutting machine, the combination with supportng rolls and a cutter disc, of an arm in one end of which one of said elements is journaled, a counter-weight bearing against the other end of said arm, the bearing point constituting a fulcrum about which the arm may swing, and power operated means for moving said arm, said means acting on the arm at a point between the fulcrum and the cutting element carried by the arm, whereby the counter-weight will be lifted by the power operating means after a predetermined pressure has been developed at the cutting elements, thus relieving such cutting elements of excessive strain.

10. In a pipe cutting machine, the combination with supporting rolls and a cutter disc, of an arm in one end of which one of said elements is journaled, a yieldingly mounted support on which the other end of said arm is pivoted, a power shaft for moving said arm, and operative mechanism between said shaft and arm comprising a yielding connection and acting on said arm at a point between its pivotal support and the cutting element carried by the arm.

11. In a pipe cutting machine, the combination with supporting rolls, and a cutter disc, of an arm in which one of said elements is journaled, a yieldingly mounted support on which said arm is pivoted, a power shaft for moving said arm, and operative connections between said shaft and arm comprising a yielding cushion.

12. In a pipe cutting machine, the combination with supporting rolls, and a cutter disc, of an arm in which one of said elements is journaled, means for pivoting said arm against a normally rigid support having means permitting it to yield when the pressure exceeds a predetermined amount, a power shaft for moving said arm, and an operative connection between said power shaft and arm.

13. In a pipe cutting machine, the combination with supporting rolls and a cutter disc, of an arm in one end of which said rolls are journaled, an adjustable pivotal support for the other end of said arm, and power means for moving said arm so as to shift said rolls toward said cutter disc, said means acting on said arm at a point between its pivotal support and said rolls.

14. In a pipe cutting machine, the combination with supporting rolls and a cutter disc, constituting cutting elements, of an arm in one end of which one of said elements is journaled, means for yieldingly and pivotally supporting the other end of said arm, a power shaft for moving said arm, and an operative connection between said shaft and arm, and acting on said arm at a point between said pivotal support and the cutting element.

15. In a pipe cutting machine, the combination with supporting rolls and a cutter disc, constituting cutting elements, of an arm in one end of which one of said elements is journaled, a movable member on which the other end of said arm is supported, means acting on said arm between its point of support and the cutting element for moving the same to effect cutting, and means for opposing a small resistance to the movement of said member during the initial travel of said arm, and for increasing such resistance during the further travel thereof.

16. In a pipe cutting machine, the combination with a rotary cutter disc, and rolls for supporting the pipe to be cut, of mechanism for automatically first bringing the cutter into contact with the pipe under a light pressure, and then, after the pipe has begun to rotate, applying a heavier pressure to effect the cut.

17. In a pipe cutting machine, the combination with a rotary cutter disc, and rolls for supporting the pipe to be cut, of power operated mechanism for automatically moving one of said elements toward the other to effect the cut, said mechanism including automatic means for first applying a light pressure and subsequently a heavier pressure between the cutter and pipe.

18. In a pipe cutting machine, the combination with a rotary cutter disc, and rolls for supporting the pipe to be cut, of power operated mechanism for bringing the cutter and pipe together to effect the cut, means for limiting the possible contact pressure between pipe and cutter during the initial stages of the cut, and means for automatically subsequently increasing such pressure.

19. In a pipe cutting machine, the combination with a rotary cutter disc, and rolls for supporting the pipe to be cut, of power operated mechanism for bringing the cutter and pipe together to effect the cut, means for limiting the possible contact pressure between pipe and cutter during part of the cut to a predetermined amount, and means for automatically limiting it to a greater amount during another part of the cut.

20. In a pipe cutting machine, the combination with a rotary cutter disc, and rolls for supporting the pipe to be cut, of power operated mechanism for bringing the cutter and pipe together to effect the cut, means for limiting the possible contact pressure between pipe and cutter during part of the cut, and means for applying a greater, though also limited pressure, during another part of the cut.

21. In a pipe cutting machine, the combination with a rotary cutter disc, and rolls for supporting the pipe to be cut, of means for automatically moving one of said elements toward the other a predetermined distance into operative position, maintaining them substantially in such position during a definite time interval, and then forcing them gradually nearer together.

22. In a pipe cutting machine, the combination with a frame, of a cutter shaft journaled therein, a plurality of cutter discs rigidly mounted on said shaft, a set of supporting rolls for each cutter disc, and individual operating means for moving each set of rolls towards its respective cutter disc.

23. In a pipe cutting machine, the combination with a frame, of a cutter shaft journaled therein, a plurality of cutter discs rigidly mounted on said shaft, a set of supporting rolls for each cutter disc, and individual power operating means for moving said sets of rolls one after another towards their respective cutter discs in predetermined order.

24. In a pipe cutting machine, the combination with a frame, of a cutter shaft journaled therein at its ends and having mounted thereon intermediate its ends a plurality of cutter discs arranged in spaced relation along the shaft, a thrust bearing disposed at one side of the shaft adjacent each cutter disc and serving to support the shaft against lateral pressure at such points, and a set screw for individually adjusting said thrust bearings toward and from the shaft so as to maintain the same in alinement.

25. In a pipe cutting machine, the combination with a cutter shaft and a cam shaft, and means for driving the same, of a cutter disc on the cutter shaft, supporting rolls co-operating therewith, means operated by the cam shaft for shifting said rolls toward said cutter disc, and means for varying the speed of said cam shaft independently of said cutter shaft.

26. In a machine of the class described, a plurality of operators' stations, cutting mechanism at each station, a power shaft for actuating all of said mechanisms, a clutch for disconnecting said power shaft from said cutting mechanisms, and a clutch-actuating shaft extending past all of the operators' stations and having an operating lever at each station, whereby the operator at any station may disconnect the clutch.

27. In a pipe cutting machine, a rotary cutter disc, a pipe support in co-operative relation therewith, a stop adapted to engage the end of the pipe when moved longitudinally on said support, so as to determine the length to be cut off, means for producing relative movement between said pipe support and cutter disc to bring the pipe and cutter together, and means independent of the pipe for simultaneously producing relative movement between said pipe support and stop so as to cause the pipe to clear said stop as soon as the cutter engages the pipe.

28. In a pipe cutting machine, a rotary cutter disc, a stop against which the end of the pipe abuts to determine the length to be cut off, and means for bringing the disc and pipe together to effect the cutting, and for simultaneously producing relative lateral movement between the pipe and stop so that they do not remain in engagement during the cutting operation.

29. In a pipe cutting machine, a rotary cutter disc, a stop against which the end of the pipe abuts to determine the length to be cut off, means for bringing the pipe and cutter disc together, and means independent of the pipe for simultaneously shifting said stop laterally so that it is out of line with the pipe during the cutting operation.

30. In a pipe cutting machine, the combination with cutting mechanism which tends to expand the pipe longitudinally, of a stop adapted to be engaged by the end of the pipe to determine the length to be cut off, and mechanism independent of the pipe for shifting said stop out of engagement with the pipe end during the cutting operation, whereby the pipe is free to expand without jamming against the stop.

31. In a pipe cutting machine, the combination with a cutter disc and pipe supporting rolls, of a pivoted arm in which said rolls are journaled, means for swinging said arm on its pivot so as to move said rolls relative to said disc, and for driving the latter, a lateral extension carried by said arm adjacent the rolls, and pipe engaging means carried by said extension for supporting and guiding the pipe as it is fed to the cutting mechanism.

32. In a pipe cutting machine, a rotary cutter disc, a stop adapted to engage the end of the pipe to determine the length to be cut off, means for continuously feeding the pipe towards the stop, means for bringing the cutter and pipe together to effect the cut, and mechanism for automatically withdrawing the stop out of the path of movement of the pipe as soon as the cutter disc takes hold.

33. In a machine for cutting off sections of pipe and the like, the combination with suitable cutting mechanism, of a take-off device, and mechanism for causing said device to move into engagement with a pipe section before it is cut off and to subsequently move the severed section from the cutting mechanism.

34. In a machine for cutting off sections of pipe and the like, the combination with suitable cutting mechanism, of a take-off device comprising a finger, and means for causing said finger to enter a pipe section before it is cut off and then remove such section from the cutting mechanism after it is severed.

35. In a machine for cutting off sections of pipe and the like, the combination with suitable cutting mechanism having means for rotating the pipe, of a take-off device constructed to loosely engage a pipe section as it is being cut off, so as not to interfere with the free rotation thereof, said take-off device serving to support the pipe section so as to prevent it from falling.

36. In a machine for cutting off sections of pipe and the like, the combination with suitable cutting mechanism, of a take-off device, and means for causing said take-off device to first move into confining relation with a section before it is completely severed, and then remove the severed section from the cutting mechanism.

37. In a machine for cutting off sections of pipe and the like, the combination with suitable cutting mechanism, of a take-off device for removing the severed sections, said device having a portion constructed to loosely engage the pipe, means for bringing said portion into line with the pipe, then shifting it longitudinally of the pipe into engagement with the section being severed, and subsequently moving it laterally, after the cutting operation is completed, so as to carry the severed section away.

38. In a machine for cutting off sections of pipe and the like, the combination with suitable cutting mechanism, of a picker arm having a finger, and means for automatically shifting said arm so as to cause said finger to enter a pipe section as it is being cut off and then move laterally so as to carry said section away from the cutting mechanism.

39. In a machine for cutting off sections of pipe and the like, the combination with suitable cutting mechanism, of a picker arm having a finger, means for automatically shifting said arm so as to cause said finger to enter a pipe section as it is being cut off, and then move laterally away from the cutting mechanism, and means for automatically removing the pipe sections from said finger.

40. In a machine for cutting off sections of pipe and the like, the combination with suitable cutting mechanism, of a picker arm having a finger, means for automatically shifting said arm through a predetermined cycle to effect the following successive functions; first, move said finger into line with the pipe; second, shift said finger longitudinally so as to cause it to enter a pipe section as it is being cut off; third, move laterally away from the cutting mechanism; and fourth, shift longitudinally so as to strip the carried section from said finger.

41. In a machine for cutting off sections of pipe and the like, the combination with suitable cutting mechanism having means for rotating the pipe and operating in such a way as to tend to cause the severed pipe sections to be hurled away, of means for loosely engaging said pipe sections during the cutting operation so as to prevent their escape, and at the same time permit their free rotation.

42. In a pipe cutting machine, the combination with cutting mechanism, of an oscillating carrier, automatic means for first actuating said carrier to convey a piece of pipe laterally into position to be cut, and then actuating the cutting mechanism after the pipe is in position.

43. In a pipe cutting machine in which the pipe rotates, the combination with cutting mechanism, of a reciprocable conveying device, means for moving said devices in one direction to convey a piece of pipe laterally into position to be cut, means for actuating the cutting mechanism while the conveying device remains in engagement with the pipe, and means for then moving said conveying device in the other direction to carry the cut section away.

44. In a pipe cutting machine in which the pipe rotates, the combination with cutting mechanism, of a finger on which a piece of pipe to be cut may be loosely supported, means for shifting said finger so as to bring the pipe into a position to be cut, and means for actuating the cutting mechanism while said finger remains in the pipe.

45. In a pipe cutting machine, the combination with a cutter disc and rolls for rotatably supporting the pipe, of a finger over which the pipe to be cut may be slipped, means for moving said finger so as to bring the pipe into position to be cut, and for actuating the cutting elements, said finger remaining in said pipe between the cutter disc and rolls during the cutting operation.

46. In a pipe cutting machine, the combination with cutting mechanism, of means for automatically positioning a scrap of pipe relative to such mechanism so that a section measuring the greatest possible whole number of predetermined units of length which the scrap contains will be cut therefrom when the cutting mechanism is actuated.

47. In a pipe cutting machine, the combination with cutting mechanism, of means for automatically positioning a scrap of pipe relative to such mechanism so that a section measuring a definite number of predetermined units of length will be cut therefrom with the least possible remainder, when the cutting mechanism is actuated.

48. In a machine for working up scraps of pipe of varying lengths, the combination with cutting mechanism, and means for conveying the scraps to such cutting mechanism, of means for automatically positioning each scrap relative to the cutting mechanism so as to cause said cutting mechanism to trim off therefrom the shortest possible fragment necessary to produce a piece containing a whole number of predetermined units of length.

49. In a machine for working up scraps of pipe of varying lengths, the combination with the cutting mechanism, of a group of spaced stops, means for moving a scrap of pipe toward said group of stops, and means controlled by the length of the scrap for automatically selecting the particular stop needed to properly position such scrap relative to the cutting mechanism.

50. In a machine for working up scraps of pipe of varying lengths, the combination with the cutting mechanism, of a group of spaced stops, means for moving a scrap of pipe toward said group of stops, and for bringing the end thereof into engagement with one of such stops to properly position the scrap relative to the cutting mechanism, and means dependent upon the length of the scrap for automatically determining the particular stop selected for such engagement.

51. In a pipe cutting machine, the combination with cutting mechanism, of a series of spaced stops, and automatic means for selectively bringing the end of a scrap of pipe into engagement with the proper one of said series of stops to position said scrap so that a section containing a maximum number of units of length will be cut therefrom when said cutting mechanism is actuated.

52. In a pipe cutting machine, the combination with cutting mechanism, of a series of stops uniformly separated from each other by a definite unit of length and automatic means for selectively bringing the end of a scrap of pipe to be cut into engagement with the proper one of said stops to position said scrap so that a section measuring a maximum number of said units of length will be cut therefrom when said cutting mechanism is actuated.

53. In a pipe cutting machine, the combination with cutting mechanism, of a series of stops uniformly separated from each other by a definite unit of length and automatic means for selectively bringing the end of a scrap of pipe to be cut into engagement with the proper one of said stops to position said scrap so that a section containing a given number of said units of length will be cut therefrom with a minimum waste when said cutting mechanism is actuated.

54. In a pipe cutting machine, the combination with cutting mechanism, of a series of stops uniformly spaced from each other by a definite unit of length, means for simultaneously shifting all of said stops away from the position occupied by the pipe being cut, means for bringing a scrap of pipe laterally into a position adjacent said stops, means for then permitting said stops to move by gravity towards the pipe, some of said stops engaging the side of the pipe, and another taking a position adjacent the end thereof, and means for then shifting said pipe longitudinally so as to bring its end into engagement with said last mentioned stop, whereby said pipe is so positioned relative to the cutting mechanism that a section containing a definite number of units of length is severed when said cutting mechanism is actuated.

55. In a pipe cutting machine, the combination with cutting mechanism, of a series of stops uniformly spaced from each other by a definite unit of length, means for shifting all of said stops simultaneously away from the axis of the pipe when in cutting position, means for laterally moving a piece of pipe into alinement with such axis while said stops are so shifted, means for permitting said stops to move by gravity towards such axis, some of said stops moving across said axis, and means for shifting said pipe longitudinally until its end engages the nearest stop which has moved across the cutting axis, whereby the pipe is so positioned relative to the cutting mechanism that a section comprising the maximum number of said units of length which the piece contains will be severed when the cutting mechanism is actuated.

56. In a pipe cutting machine, the combination with cutting mechanism, of a series of stops uniformly spaced from each other by a definite unit of length, means for simultaneously shifting all of said stops away from the position occupied by the pipe being cut, holding them in this position for a predetermined interval while a pipe scrap is fed in, and then permitting them to move by gravity toward the pipe, whereby some of said stops engage the side of the pipe, and another takes a position adjacent the end thereof, and means for then bringing the cutting mechanism into operation.

57. In a pipe cutting machine, the combination with cutting mechanism, of a picker arm having a finger on which a piece of pipe to be cut may be loosely supported so as to be capable of rotation thereon, and means for shifting said arm so as to carry said piece of pipe into and out of cutting position.

58. In a pipe cutting machine, the combination with cutting mechanism, of a picker arm having a finger on which a piece of pipe to be cut may be loosely supported, means for shifting said arm so as to carry said piece of pipe into and out of cutting position, and means for adjusting said arm relative to its shifting mechanism so as to alter the position of said finger relative to said cutting mechanism.

59. In a pipe cutting machine, the combination with cutting mechanism, of a picker arm, a finger carried by said arm and adapted to support a piece of pipe to be cut, means for shifting said arm and finger so as to move the pipe into and out of cutting position and means for adjusting the position of said finger relative to the cutting mechanism.

60. In a pipe cutting machine, the combination with a rotary cutter disc, of a pair of rolls on which the pipe to be cut is supported, and a frame in which said rolls are journaled, said rolls having cylindrical end portions of reduced diameter, whereby the pipe bears only on the middle portions thereof.

In testimony whereof I affix my signature.

HACKLEY MORRISON.